US012587959B2

(12) United States Patent

He et al.

(10) Patent No.: US 12,587,959 B2

(45) Date of Patent: Mar. 24, 2026

(54) SYSTEM INFORMATION TRANSMISSION IN A CARRIER AGGREGATION SYSTEM

(71) Applicant: Apple Inc., Cupertino, CA (US)

(72) Inventors: Hong He, Cupertino, CA (US); Dawei Zhang, Saratoga, CA (US); Chunxuan Ye, San Diego, CA (US); Sigen Ye, San Diego, CA (US); Weidong Yang, San Diego, CA (US); Wei Zeng, San Diego, CA (US); Oghenekome Oteri, San Diego, CA (US); Haitong Sun, Cupertino, CA (US); Yushu Zhang, Beijing (CN); Huaning Niu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 449 days.

(21) Appl. No.: 18/109,060

(22) Filed: Feb. 13, 2023

(65) Prior Publication Data

US 2023/0319706 A1 Oct. 5, 2023

Related U.S. Application Data

(60) Provisional application No. 63/325,912, filed on Mar. 31, 2022.

(51) Int. Cl.
*H04W 52/02* (2009.01)
*H04L 5/00* (2006.01)
*H04W 48/12* (2009.01)

(52) U.S. Cl.
CPC ....... *H04W 52/0206* (2013.01); *H04L 5/0035* (2013.01); *H04L 5/0053* (2013.01); *H04L 5/0098* (2013.01); *H04W 48/12* (2013.01)

(58) Field of Classification Search
CPC ......................... H04W 52/0206; H04W 48/12; H04L 5/0035; H04L 5/0053; H04L 5/0098
See application file for complete search history.

(56) References Cited

U.S. PATENT DOCUMENTS

| | | | |
|---|---|---|---|
| 2015/0281974 A1* | 10/2015 | Ghasemzadeh ... | H04W 72/0453 455/454 |
| 2021/0092629 A1* | 3/2021 | Fang ..................... | H04W 16/10 |

(Continued)

OTHER PUBLICATIONS

Ericsson, "MIB, SIBs and Paging for NB-IoT TDD", 3GPP TSG-RAN WG2 #100, Reno, USA, Nov. 24-Dec. 1, 2017, R2-1713360 (Year: 2017).*

(Continued)

*Primary Examiner* — Joseph A Bednash

(74) *Attorney, Agent, or Firm* — Sterne, Kessler, Goldstein & Fox P.L.L.C.

(57) ABSTRACT

A base station can include a transceiver and a processor communicatively coupled to the transceiver. The transceiver can enable wireless communication with a user equipment (UE) by a first component carrier (CC) in a first cell managed by the base station in a carrier aggregation (CA) wireless communication system. The processor can generate a system scheduling message to be transmitted on the first CC to the UE in the first cell, where the system scheduling message comprises a schedule of monitoring occasions for system information of a second CC by the UE in a second cell. Afterwards, the processor can transmit the system scheduling message on the first CC to the UE.

20 Claims, 7 Drawing Sheets

(56) References Cited

U.S. PATENT DOCUMENTS

| | | | |
|---|---|---|---|
| 2022/0006690 A1* | 1/2022 | Matsumura | H04L 41/0672 |
| 2022/0210844 A1* | 6/2022 | MolavianJazi | H04W 24/08 |

OTHER PUBLICATIONS

International Search Report for Application No. PCT/US2023/064337, mailed Jun. 29, 2023, 5 pages.

Written Opinion for Application No. PCT/US2023/064337, mailed Jun. 29, 2023, 13 pages.

Ericsson: "MIB, SIBs and Paging for NB-IoT TDD", 3GPP Draft; R2-1713360, $3^{rd}$ Generation Partnership Project (3GPP), Mobile Competence Centre; 650, Route Des Lucioles; F-06921 Sophia-Antipolis Cedex; France, vol. RAN WG2, No. Reno, USA; Nov. 27, 2017-Dec. 1, 2017, Nov. 16, 2017, XP051371111, Retrieved from the Internet: URL: http://www.3gpp.org/ftp/tsg%5Fran/WG2%5FRL2/TSGR2%5F100/Docs/; [retrieved on Nov. 16, 2017].

Ericsson (Rapporteur): "Interim draft TS38331 v15.2.0", 3GPP Draft; R2-1809240 Interim Draft TS38331 V15.2.0, 3rd Generation Partnership Project (3GPP), Mobile Competence Centre; 650, Route Des Lucioles; F-06921 Sophia-Antipolis Cedex; France, No. Busan, South Korea; May 21, 2018-May 25, 2018, Jun. 6, 2018, XP051520563, Retrieved from the Internet: URL: http://www.3gpp.org/ftp/tsg%SFran/WG2%SFRL2/TSGR2%5F102/Docs/R2%2D1809240%2Ezip; [retrieved on Jun. 6, 2018].

* cited by examiner

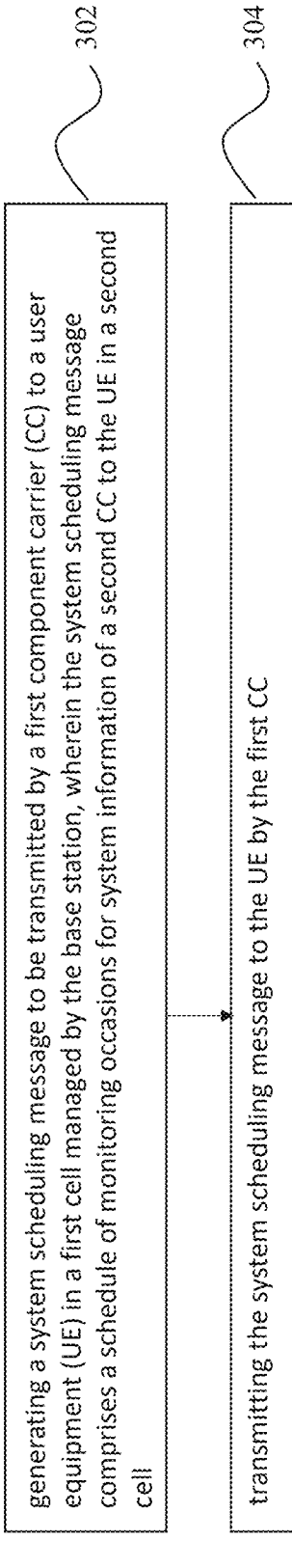

300

302 generating a system scheduling message to be transmitted by a first component carrier (CC) to a user equipment (UE) in a first cell managed by the base station, wherein the system scheduling message comprises a schedule of monitoring occasions for system information of a second CC to the UE in a second cell

304 transmitting the system scheduling message to the UE by the first CC

FIG. 3

SYSTEM INFORMATION TRANSMISSION IN A CARRIER AGGREGATION SYSTEM

CROSS REFERENCES

This application claims the benefit of U.S. Provisional Application No. 63/325,912 filed Mar. 31, 2022, titled "System information transmission in a carrier aggregation system," the content of which is herein incorporated by reference in its entirety.

BACKGROUND

Field

The described aspects generally relate to wireless communication systems, and particularly to the transmission of system information in a carrier aggregation (CA) wireless communication system.

Related Art

A wireless communication system can include a fifth generation (5G) system, a New Radio (NR) system, a long term evolution (LTE) system, a combination thereof, or some other wireless systems. In addition, a wireless communication system can support a wide range of use cases such as enhanced mobile broad band (eMBB), massive machine type communications (mMTC), ultra-reliable and low-latency communications (URLLC), and enhanced vehicle to anything communications (eV2X). Carrier aggregation (CA) is used in LTE-Advanced systems and beyond in order to increase the bandwidth and the bitrate of wireless communications. When CA is implemented, a user equipment (UE) can communicate with one or more base stations using multiple component carriers (CCs). There can be many challenges for a CA system such as low power operations.

SUMMARY

Some aspects of this disclosure relate to apparatuses and methods for implementing techniques in a carrier aggregation (CA) system for transmitting, by a first component carrier (CC) to a user equipment (UE) in a first cell managed by a base station, a system scheduling message to schedule monitoring occasions for system information of a second CC by the UE in a second cell. Accordingly, embodiments can save energy for the base station since the base station does not need to schedule monitoring occasions for system information of the second CC separately using the second CC. The implemented techniques can be applicable to many wireless systems, e.g., a wireless communication system based on 3rd Generation Partnership Project (3GPP) release 15 (Rel-15), release 16 (Rel-16), release 17 (Rel-17), or beyond.

Some aspects of this disclosure relate to a base station. The base station can include a transceiver and a processor communicatively coupled to the transceiver. The transceiver can enable wireless communication with a UE by a first CC in a first cell managed by the base station. The processor can generate a system scheduling message to be transmitted on the first CC to the UE in the first cell, where the system scheduling message comprises a schedule of monitoring occasions for system information of a second CC by the UE in a second cell. Afterwards, the processor can transmit the system scheduling message on the first CC to the UE. In addition, the processor can transmit the system information of the second CC to the UE according to the schedule of monitoring occasions for the system information of the second CC According to some aspects, the first cell can be a serving cell or an anchor cell (A-cell) operating in a legacy operation mode and the second cell can be a booster cell (B-cell) operating in a power saving mode. The first cell and the second cell can be co-located and overlaid, or non co-located but overlaid. The first CC can be in a first frequency range (FR1), and the second CC can be in a second frequency range (FR2). In some embodiments, an absolute radio frequency channel number (ARFCN) of the second CC for the second cell may not be located in a Global Synchronization Channel Number (GSCN) for a frequency band corresponding to the second CC.

According to some aspects, the system scheduling message may include a physical layer cell identifier (ID) of the second cell, and an absolute radio frequency channel number (ARFCN) value of the second cell. In some embodiments, a schedule of monitoring occasions of system information for the first CC can have a first period, and the schedule of monitoring occasions of the system information for the second CC can have a second period different from the first period.

According to some aspects, the system scheduling message can include a downlink control message carried by a physical downlink control channel (PDCCH), and the schedule of monitoring occasions for the system information of the second CC can include a schedule of monitoring occasions for system information block type 1 (SIB1) of the second CC. In some embodiments, the system scheduling message further comprises a schedule of monitoring occasions for system information of a third CC by the UE in a third cell.

According to some aspects, the system scheduling message can include a SIB1 message of the first CC in the first cell, and the schedule of monitoring occasions for the system information of the second CC can be included in a system information block of the first CC that is scheduled by the SIB1 message of the first CC. The system scheduling message can further configure a first system information (SI) window of a first length for the first CC in the first cell, and a second SI window of a second length different from the first length for the second CC in the second cell. The SIB1 message can include a first SIB message of the first CC in the first cell, and a second SIB message of the second CC in the second cell, where the second SIB message may be placed after the first SIB message within the SIB1 message.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 3 illustrates an example process performed by a base station to transmit system information in a CA wireless communication system, according to some aspects of the disclosure.

Figures 1A, 1B:
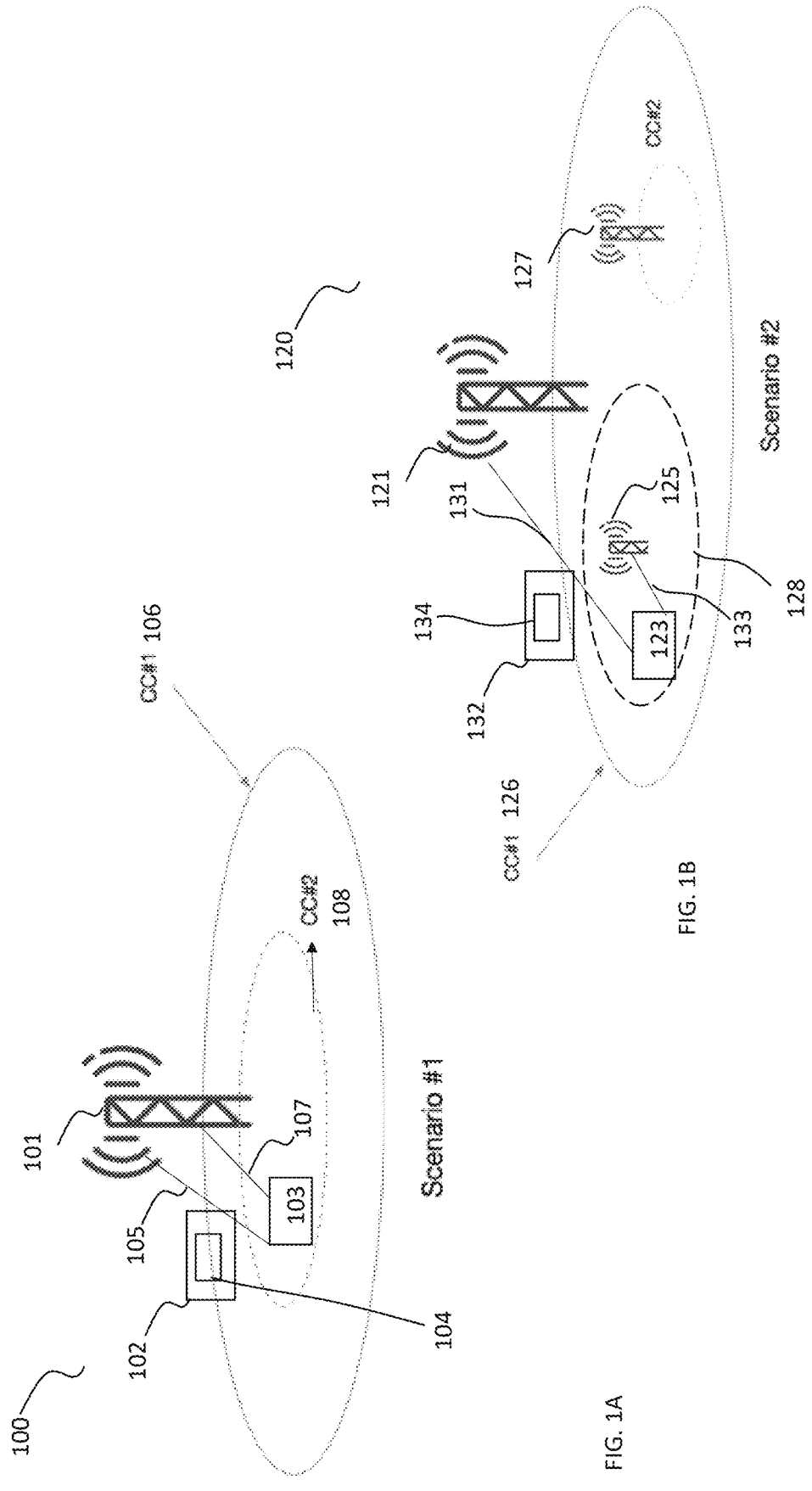
FIGS. 1A-1B illustrate wireless systems including a base station to transmit system information in a carrier aggregation (CA) wireless communication system, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Carrier aggregation (CA) is used in a long term evolution (LTE)-Advanced system, a fifth generation (5G) system, a New Radio (NR) system, or other wireless systems in order to increase the bandwidth and the bitrate. When CA is implemented, a user equipment (UE) can communicate with a base station in a primary cell (PCell) managed by the base station by a first component carrier (CC), and can further communicate with one or more base stations in secondary cells (SCell) by a second component carrier (CC). The PCell may be referred to as a first cell and the SCell may be referred to as a second cell. In some situations, the first cell can be a serving cell or an anchor cell (A-cell) operating in a legacy operation mode and the second cell can be a booster cell (B-cell) operating in a power saving mode. In some systems, the base station in the second cell may still transmit system information of the second CC in the second cell. When the base station in the second cell is in the power saving mode, transmission of the system information of the second CC in the second cell can cause the base station to consume more power.

Some aspects of this disclosure provide mechanisms for a base station in the first cell to transmit on the first CC in the first cell system information of the second CC in the second cell. The base station in the first cell may generate a system scheduling message to be transmitted on the first CC to the UE in the first cell, where the system scheduling message comprises a schedule of monitoring occasions for system information of a second CC by the UE in a second cell. Afterwards, the base station in the first cell can transmit the system scheduling message on the first CC to the UE. In addition, the base station in the first cell can transmit the system information of the second CC to the UE according to the schedule of monitoring occasions for the system information of the second CC. By doing so, the base station in the second cell can remain in the power saving mode without transmitting the system information of the second CC to the UE. Hence, the base station in the second cell can save power in the operations.

FIGS. 1A-1B illustrate a wireless system 100 including a base station 101 and a wireless system 120 including a base station 121 to transmit system information in a CA wireless system, according to some aspects of the disclosure. Wireless system 100 and wireless system 120 are provided for the purpose of illustration only and does not limit the disclosed aspects. A wireless system can be referred to as a wireless network, a wireless communication system, or some other names known to a person having ordinary skill in the art.

As shown in FIG. 1A, wireless system 100 can include, but is not limited to, base station 101 and a UE 103. There can be other network entities, e.g., network controller, a relay station, not shown. Base station 101 can wirelessly communicate with UE 103 by a first CC 105 in a first cell 106, and can communicate with UE 103 by a second CC 107 in a second cell 108. Base station 101 can generate a system scheduling message 102 to be transmitted on the first CC 105 to UE 103 in the first cell 106, where the system scheduling message 102 includes a schedule of monitoring occasions 104 for system information of the second CC 107 to be monitored by UE 103 in the second cell 108. The first cell 106 and the second cell 108 are co-located and overlaid, both served by the same base station 101.

As shown in FIG. 1B, wireless system 120 can include, but is not limited to, base station 121, a base station 125, a base station 127, and a UE 123. There can be other network entities, e.g., network controller, a relay station, not shown. Base station 121 can wirelessly communicate with UE 123 on the first CC 131 in the first cell 126, while base station 125 can communicate with UE 103 by the second CC 133 in the second cell 128. The first cell 126 and the second cell 128 are non co-located but overlaid. In some examples, base station 121, base station 125, and base station 127 can be interconnected to one another and/or to other base station or network nodes in a network through various types of backhaul interfaces such as a direct physical connection, a virtual network, and/or the like, not shown. Base station 121 can generate a system scheduling message 132 to be transmitted on the first CC 131 to UE 123 in the first cell 126, where the system scheduling message 132 can include a schedule of monitoring occasions 134 for system information of the second CC 133 to be monitored by UE 123 in the second cell 128.

In the following, more details are provided for wireless system 100, base station 101 and UE 103 as described in FIG. 1A. Similar details are applicable to wireless system 120, base station 121, base station 125, and UE 123 as described in FIG. 1B, which are known to a person of ordinary skill in the arts.

In some examples, wireless system 100 can be a NR system, a LTE system, a 5G system, or some other wireless system. In addition, wireless system 100 can support a wide range of use cases such as enhanced mobile broad band (eMBB), massive machine type communications (mMTC), ultra-reliable and low-latency communications (URLLC), and enhanced vehicle to anything communications (eV2X).

According to some aspects, UE 103 can be stationary or mobile. UE 103 can be a cellular phone (e.g., a smart phone), a personal digital assistant (PDA), a wireless modem, a wireless communication device, a handheld device, a laptop, a desktop, a cordless phone, a wireless local loop station, a tablet, a camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IOT) device, a machine-type communication (MTC)

device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, base station 101 can be a fixed station or a mobile station. Base station 101 can also be called other names, such as a base transceiver system (BTS), an access point (AP), a transmission/reception point (TRP), an evolved NodeB (eNB), a next generation node B (gNB), a 5G node B (NB), or some other equivalent terminology.

According to some aspects, base station 101 can provide wireless coverage for the first cell 106 on the first CC 105, and also provide wireless coverage for the second cell 108 contained within the first cell 106 by the second CC 107. The second cell 108 can be contained within the first cell 106. The first cell 106 and the second cell 108 can be a macro cell, a pico cell, a femto cell, and/or another type of cell. For comparison, a macro cell can cover a relatively large geographic area, e.g., several kilometers in radius, a femto cell can cover a relatively small geographic area, e.g., a home, while a pico cell covers an area smaller than the area covered by a macro cell but larger than the area covered by a femto cell. For example, the first cell 106 can be a macro cell, while the second cell 108 can be a pico cell or a femto cell. In addition, the first cell 106 can be a pico cell, while the second cell 108 can be a femto cell. In some examples, the geographic area of a cell can move according to the location of a mobile base station.

According to some aspects, the first cell 106 can be an anchor cell (A-cell) operating in a legacy operation mode and the second cell 108 can be a booster cell operating in a power saving mode. A base station operating in the legacy operation mode may consume more power than the base station operating in the power saving mode. In addition, a base station operating in the legacy operation mode may support various UEs that operate in the corresponding legacy operation mode, while the power saving mode may be defined by a newer standard that may not be compatible with some UEs. In some embodiments, the first CC 105 can be in a first frequency range (FR1), and the second CC 107 can be in a second frequency range (FR2). In some other embodiments, the first CC 105 and the second CC 107 can be in a same frequency range. In some embodiments, an absolute radio frequency channel number (ARFCN) of the second CC 107 for the second cell 108 may not be located in a Global Synchronization Channel Number (GSCN) for a frequency band corresponding to the second CC 107.

Figure 2:
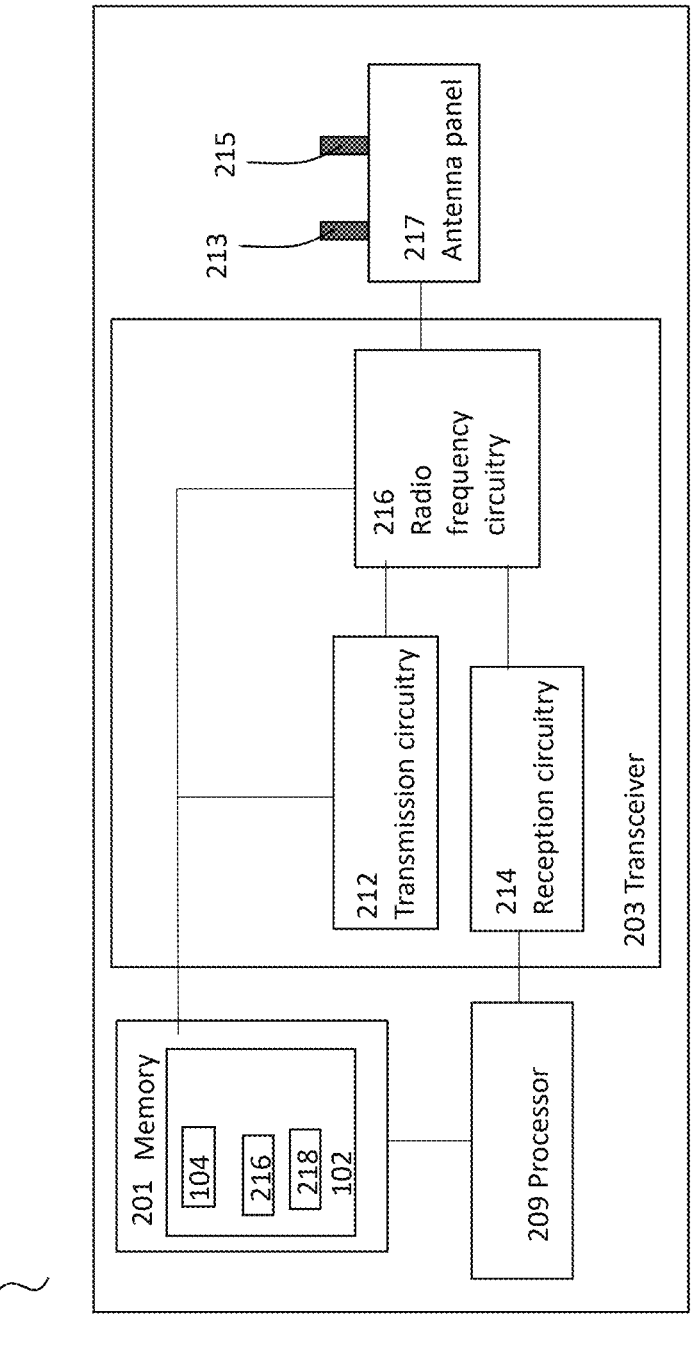
FIG. 2 illustrates a block diagram of a base station, according to some aspects of the disclosure.

According to some aspects, base station 101 can be implemented according to a block diagram as illustrated in FIG. 2. Referring to FIG. 2, base station 101 can have antenna panel 217 including one or more antenna elements to form various transmission beams, e.g., transmission beam 213 and transmission beam 215, coupled to a transceiver 203 and controlled by a processor 209. Transceiver 203 and antenna panel 217 (using transmission beam 213 and transmission beam 215) can be configured to enable wireless communication in a wireless network. In detail, transceiver 203 can include radio frequency (RF) circuitry 216, transmission circuitry 212, and reception circuitry 214. RF circuitry 216 can include multiple parallel RF chains for one or more of transmit or receive functions, each connected to one or more antenna elements of the antenna panel. In addition, processor 209 can be communicatively coupled to a memory 201, which are further coupled to the transceiver 203.

Various data can be stored in memory 201. In some examples, memory 201 can store system scheduling message 102, or other information. System scheduling message 102 can be transmitted on the first CC 105 to UE 103 in the first cell 106. System scheduling message 102 can include schedule of monitoring occasions 104 for system information of the second CC 107 by UE 103 in the second cell 108. In some embodiments, system scheduling message 102 can include a physical layer cell identifier (ID) 216 of the second cell 108, and an absolute radio frequency channel number (ARFCN) value 218 of the second cell 108. More details of system scheduling message 102 can be described in FIGS. 3-6.

In some embodiments, memory 201 can include instructions, that when executed by processor 209 perform operations described herein, e.g., operations described in process 300 shown in FIG. 3 for base station 101 to transmit system information in a CA wireless communication system. Alternatively, the processor 209 can be "hard-coded" for base station 101 to perform operations to transmit system information in a CA wireless communication system described herein in process 300.

FIG. 3 illustrates process 300 performed by a base station, such as base station 101, to transmit system information in a CA wireless communication system, according to some aspects of the disclosure.

In some embodiments, at 302, processor 209 can be configured to generate system scheduling message 102 to be transmitted on the first CC 105 to UE 103 in the first cell 106, where system scheduling message 102 includes the schedule of monitoring occasions 104 for system information of the second CC 107 by UE 103 in the second cell 108.

Afterwards, at 304, processor 209 can transmit system scheduling message 102 to UE 103 on the first CC 105. In addition, processor 209 can transmit the system information of the second CC 107 to UE 103 according to the schedule of monitoring occasions 104 for the system information of the second CC 107.

According to some aspects, system scheduling message 102 can include a downlink control message carried by a physical downlink control channel (PDCCH), and the schedule of monitoring occasions 104 for the system information of the second CC can include a schedule of monitoring occasions for SIB1 of the second CC 107. In some embodiments, a schedule of monitoring occasions of system information for the first CC 105 can have a first period, and the schedule of monitoring occasions 104 of the system information for the second CC 107 can have a second period different from the first period. More details of an example are described in FIG. 4.

According to some aspects, system scheduling message 102 can further include a schedule of monitoring occasions for system information of a third CC by the UE in a third cell. More details of an example are described in FIG. 5.

According to some aspects, system scheduling message 102 can include a SIB1 message of the first CC 105 in the first cell 106, and the schedule of monitoring occasions 104 for the system information of the second CC 107 can be included in a system information block of the first CC 105 that is scheduled by the SIB1 message of the first CC 105. System scheduling message 102 can further configure a first system information (SI) window of a first length for the first CC 105 in the first cell 106, and a second SI window of a second length different from the first length for the second CC 107 in the second cell 108. The SIB1 message can include a first SIB message of the first CC 105 in the first cell 106, and a second SIB message of the second CC 107 in the second cell 108, where the second SIB message is placed after the first SIB message within the SIB1 message. More details of an example are described in FIG. 6.

FIG. 4 illustrates details of example process, such as process 300, performed by base station 101 to transmit system information in a CA wireless communication system, according to some aspects of the disclosure.

According to some aspects, system scheduling message 102 can include a Type0-PDCCH common search space set (CSS) associated with a common CORESET or CORESET #0. The Type0-PDCCH CSS maybe configured by a parameter PDCCHConfigCommon to monitor downlink control information (DCI) Format with System Information-Radio Network Temporary Identifier (SI-RNTI) transmitted on the first cell 106, which can be the serving cell or an Anchor Cell (A-Cell), for the second cell 108, which can be a Booster Cell (B-Cell). The Type0-PDCCH CSS can include information such as a physical layer cell ID of the second cell 108, and an ARFCN value of the second cell 108.

Figures 4A, 4B:
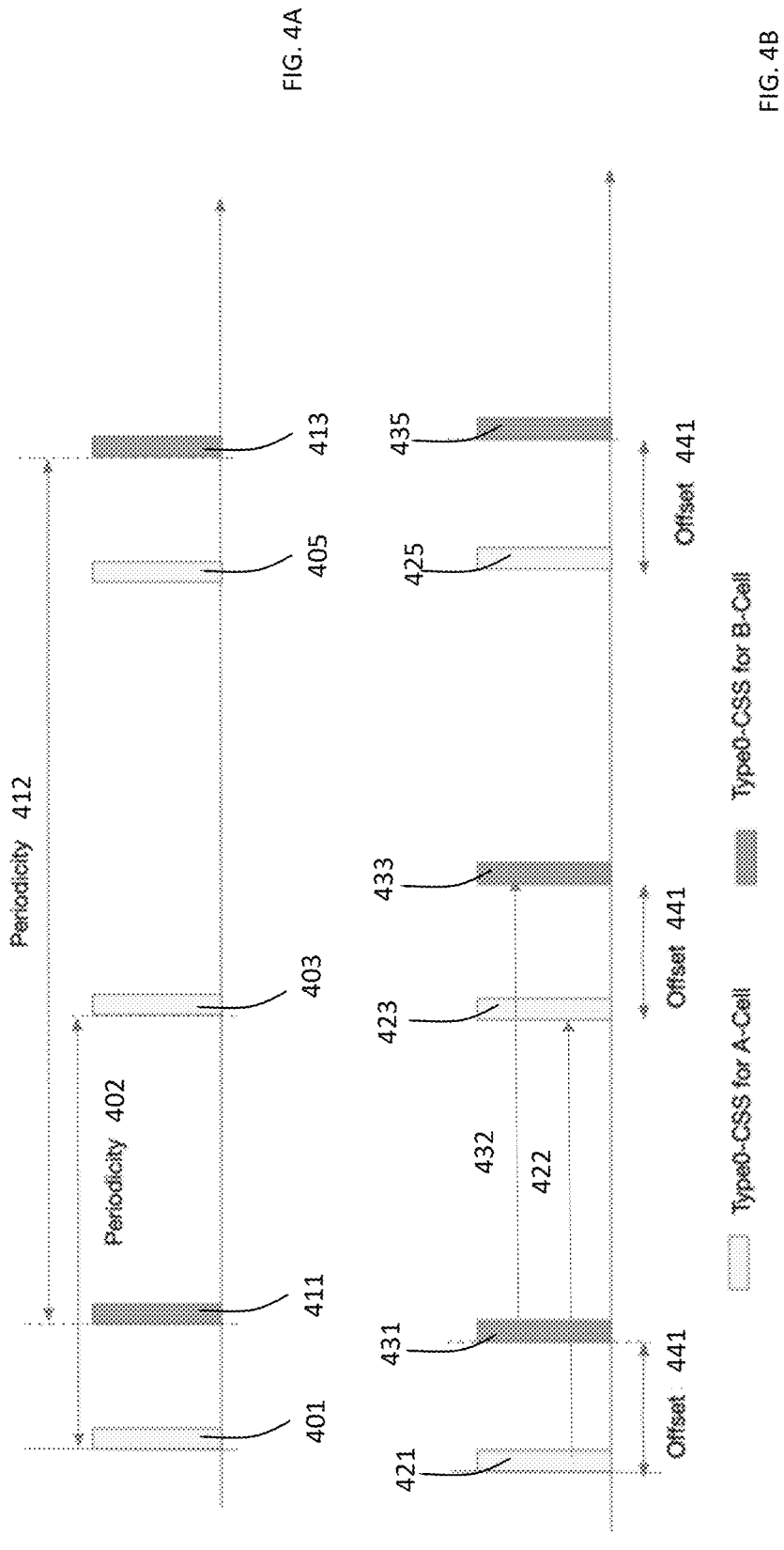
FIGS. 4-6 illustrate details of example processes performed by a base station to transmit system information in a CA wireless communication system, according to some aspects of the disclosure.

In some embodiments, as shown in FIG. 4A, a schedule of monitoring occasions of system information for the first CC 105 can have a first period 402, which is the time difference between a monitoring occasion 401 and a monitoring occasion 403, or the time difference between the monitoring occasion 403 and a monitoring occasion 405 for the first CC 105. A schedule of monitoring occasions 104 of the system information for the second CC 107 can have a second period 412 different from the first period 402. The second period 412 is the time difference between a monitoring occasion 411 and a monitoring occasion 413 for the second CC 107. The monitoring occasion 411 and the monitoring occasion 413 can be monitoring occasions for SIB1 of the second CC 107.

Alternatively, as shown in FIG. 4B, a schedule of monitoring occasions of system information for the first CC 105 can have a first period 422, which is the time difference between a monitoring occasion 421 and a monitoring occasion 423, or the time difference between the monitoring occasion 423 and a monitoring occasion 425 for the first CC 105. A schedule of monitoring occasions 104 of the system information for the second CC 107 can have a second period 432. The second period 432 is the time difference between a monitoring occasion 431 and a monitoring occasion 433 for the second CC 107, or the time difference between the monitoring occasion 433 and a monitoring occasion 435 for the second CC 107. The second period 432 can be the same as the first period 422. The monitoring occasion 431, the monitoring occasion 433, and the monitoring occasion 435 can be monitoring occasions for SIB1 of the second CC 107.

As shown in FIG. 4B, there is an offset 441 between the monitoring occasion 421 and the monitoring occasion 431, which can be the same offset between the monitoring occasion 423 and the monitoring occasion 433, and the same offset between the monitoring occasion 425 and the monitoring occasion 435. Some example code to configure the offset between the monitoring occasion 421 and the monitoring occasion 431 can be as below:

```
SearchSpace::=SEQUENCE {
searchSpaceID SearchSpaceID,
boosterCellIdentifty CellIdentity,
boosterCarrierFreq-r16 ARFCN-ValueNR,
offset INTEGER (1 . . . xxx)
. . . }
```

Figure 5:
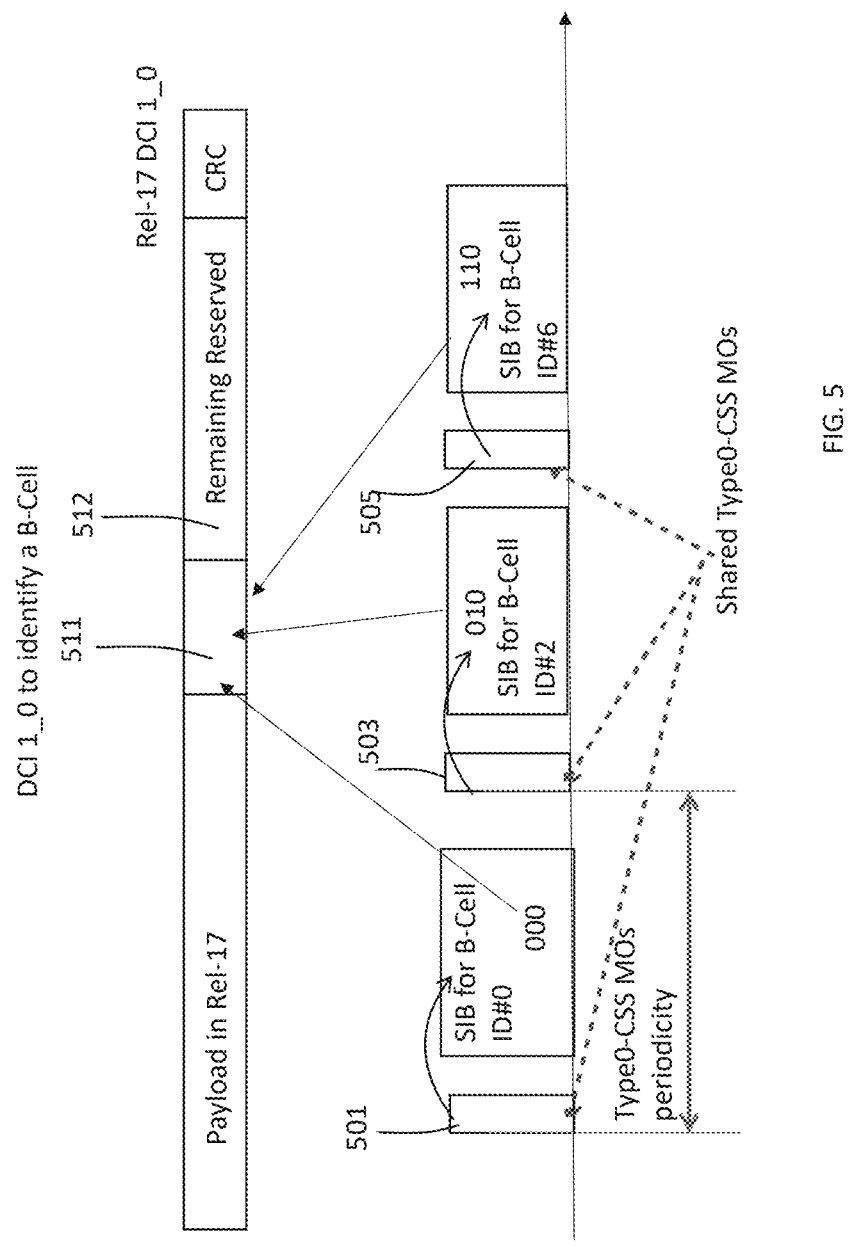

FIG. 5 illustrates details of example process, such as process 300, performed by base station 101 to transmit system information in a CA wireless communication system, according to some aspects of the disclosure.

According to some aspects, system scheduling message 102 can further include multiple schedules of monitoring occasions for system information of multiple CCs in multiple cells in addition to the second CC 107 in the second cell 108. Since system scheduling message 102 can include multiple schedules of monitoring occasions, the total number of system scheduling messages can be reduced, hence reducing the power consumptions for the base station in the A-Cell. Base stations in the B-cell can be in the power saving mode (PSM).

According to some aspects, a list of B-Cells with physical Cell IDs that transmit SIBs on system scheduling message 102 of the A-Cell maybe provided in a SIB1 or a new SIB-X that is included in system scheduling message 102. One such an example list of B-Cells can be shown in Table 1 below. Each B-Cell is assigned with a B-Cell ID to indicate a DCI Format 1_0 with SI-RNTI applicable for this cell.

TABLE 1

| B-cell configuration list | | |
|---|---|---|
| B-cell ID | Physical Cell ID | ARFCN value |
| 0 | Cell_ID X | ARFCN #X |
| 1 | Cell_ID Y | ARFCN #Y |
| 2 | Cell_ID Z | ARFCN #Z |

According to some aspects, system scheduling message 102 can include a single Type0-PDCCH CSS that is configured and commonly used for the SIB1 scheduling for all B-Cells shown in Table 1. A B-Cell ID field (BCIF) 511, as shown in FIG. 5, may be defined in DCI Format 1_0 with CRC scrambled by SI-RNTI by re-purposing a portion of the 17-bits reserved field in Rel-17 DCI Format 1_0, to take up part of the 17-bits reserved field. The other part 512 of the 17-bits reserved field can remain being reserved for other purposes.

According to some aspects, monitoring occasion 501, monitoring occasion 503, and monitoring occasion 505 may be monitoring occasions (MOs) for Type0-PDCCH message that can be shared by multiple B-cells as shown in Table 1. Multiple Type0-PDCCH messages can be sent according to a Type0-PDCCH MO periodicity. A Type0-PDCCH message can be used to schedule the SIB1 message of multiple B-cells, such as a B-cell with a BCIF=BCIF="000", "010", and '110". Hence, a Type0-PDCCH message can carry the schedule of monitoring occasions for system information of a CC in a B-cell with a BCIF="000", "010", or "110", which represents the Cell ID for the B-cells.

Figure 6:
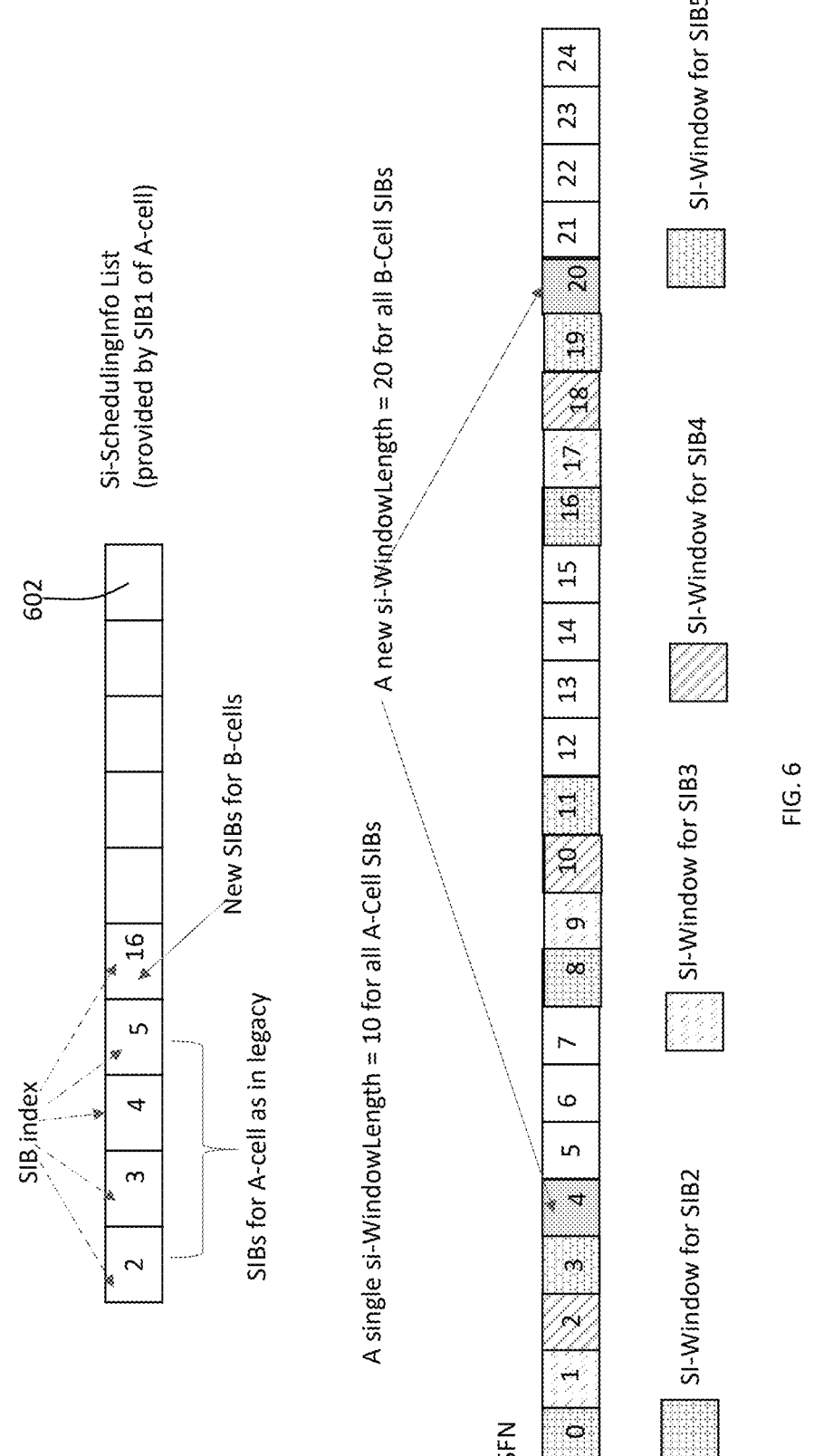

FIG. 6 illustrates details of example process, such as process 300, performed by base station 101 to transmit system information in a CA wireless communication system, according to some aspects of the disclosure.

According to some aspects, system scheduling message 102 can includes a SIB1 message of the first CC 105 in the first cell 106, and the schedule of monitoring occasions 104 for the system information of the second CC 107 can be included in a system information block (SIB) of the first CC 105 that is scheduled by the SIB1 message of the first CC 105. The SIB of the first CC 105 to schedule of monitoring occasions 104 for the system information of the second CC 107 can be a new type of SIB for the first CC 105 instead of existing SIB types for functions of the first CC 105. The scheduling using the SIB1 message of the first CC 105 can occur at the Physical Data Shared Channel (PDSCH) instead of the PDCCH. In addition, in some embodiments, the PDCCH monitor occasions for SIB for the B-cells can be the same as the PDCCH monitor occasions for the SIB1 message of the first CC 105. In some other embodiments, a separate Type0-PDCCH CSS for B-Cells SIB reception maybe configured by SIB1 of the A-Cell.

According to some aspects, the new type of SIB may include the following information provided in the new SIB payload e.g., SIB-16, when the new type of SIB is designed to dynamically schedule SIBs for multiple B-Cells: a physical layer cell ID of the B-Cell, an ARFCN value of the B-Cell, and a SIB type information, including SIB1 for B-Cells. In some embodiments, the SIB Type Information can be explicitly indicated by an IE of the scheduled new SIB. In some other embodiments, a bitmap string maybe introduced and each bit is associated with a given SIB Type.

According to some aspects, system scheduling message 102 can further configure a first system information (SI) window of a first length for the first CC 105 in the first cell 106, and a second SI window of a second length for the second CC 107 in the second cell 108. A SI window has a parameter, si-WindowLength, which defines the time duration of the SI window during which a SIB will be scheduled for transmission. In some embodiments, the si-WindowLength can be the same as the value configured by SIB1 for the other SIBs of A-Cell.

In some embodiments, the second length of the second SI window for the second CC 107 can be different from the first length of the first SI window for the first CC 105. In some embodiments, a separate si-WindowLength parameter may be explicitly configured for the new type of SIB for the B-Cells. If the new type of SIB for the B-Cells is not configured, the default case is assumed to have the same lengths for the SI windows.

In some embodiments, the SIB1 message can include a first SIB message of the first CC 105 in the first cell 106, and a second SIB message of the second CC 107 in the second cell 108, where the second SIB message is placed after the first SIB message within the SIB1 message. Such an arrangement of the first SIB message and the second SIB message can avoid the impact on the legacy UE for acquisition of A-Cell SIBs in a same schedulingInfoList.

In some embodiments, mechanisms can be applied to determine the start of SI-window for the new type of SIBs of the first CC 105.

Step-1: Determine the number n which corresponds to the order of entry in the list of SI messages configured by schedulingInfoList in si-SchedulingInfo in SIB1 for both A-Cell and B-Cells.

Step-2: Determine the integer value $x = K_1 * w_1 + (K_2 - 1) * w_2$, wherein:

$w_1$ is the si-WindowLength for the SIBs of A-Cell; and $w_2$ is the si-WindowLength for the SIBs of B-Cells; and $K_1$ corresponds to the number of entries in the list of SI messages for A-Cell with length $w_1$; and $K_2$ is the order index of new SIB entry in the list of length $w_2$.

Step-3: The SI-window starts at the slot #i, where i=x mod N, in the radio frame for which SFN mod T=FLOOR(x/N), where T is the si-Periodicity of the new SIB Message and N is the number of slots in a radio frame as specified in the technique standard TS 38.213.

10

TABLE 2

| Entry Index in list with a same SI-length | SIB Type | Period (Radio frame) | X value | Radio Frame | Slot | Target Cell |
|---|---|---|---|---|---|---|
| 1 | SIB2 | 8 | 0 | SFN mod 8 = 0 | 0 | A-Cell |
| 2 | SIB3 | 8 | 10 | SFN mod 8 = 1 | 0 | |
| 3 | SIB4 | 8 | 20 | SFN mod 8 = 2 | 0 | |
| 4 | SIB5 | 16 | 30 | SFN mod 16 = 3 | 0 | |
| 5 | SIB16 | 16 | 40 | SFN mod 16 = 4 | 0 | B-Cell |

As shown in FIG. 6, an exemplified si-SchedulingInfo list can be signaled by SIB 1 of the A-Cell, which is shown in a system scheduling message 602. System scheduling message 602 is an example of system scheduling message 102. System scheduling message 602 assumes 4 SIBs i.e., SIB2/3/4/5 for A-Cell on FR1. In addition, scheduling message includes a new SIB-16 introduced to convey SIBs for B-Cells on FR2, as shown in Table 2 above.

As shown in FIG. 6, in the transmission windows for the SIBs, a single si-WindowLength=10 slots (i.e., $w_1$=10) is used for all SIBs of A-Cell such that the legacy UEs and Rel-18 UEs has a common interpretation about the scheduling window location for each SIBs. In addition, a separate si-WindowLength=20 slots (i.e., $w_2$=20), which maybe configured to account for the increased number of DL beams and the corresponding larger number of PDCCH MOs on FR2. Other assumptions are listed in Table 2 with the following assumption N=10 (slots per radio frame, 15 kHz SCS).

Figure 7:
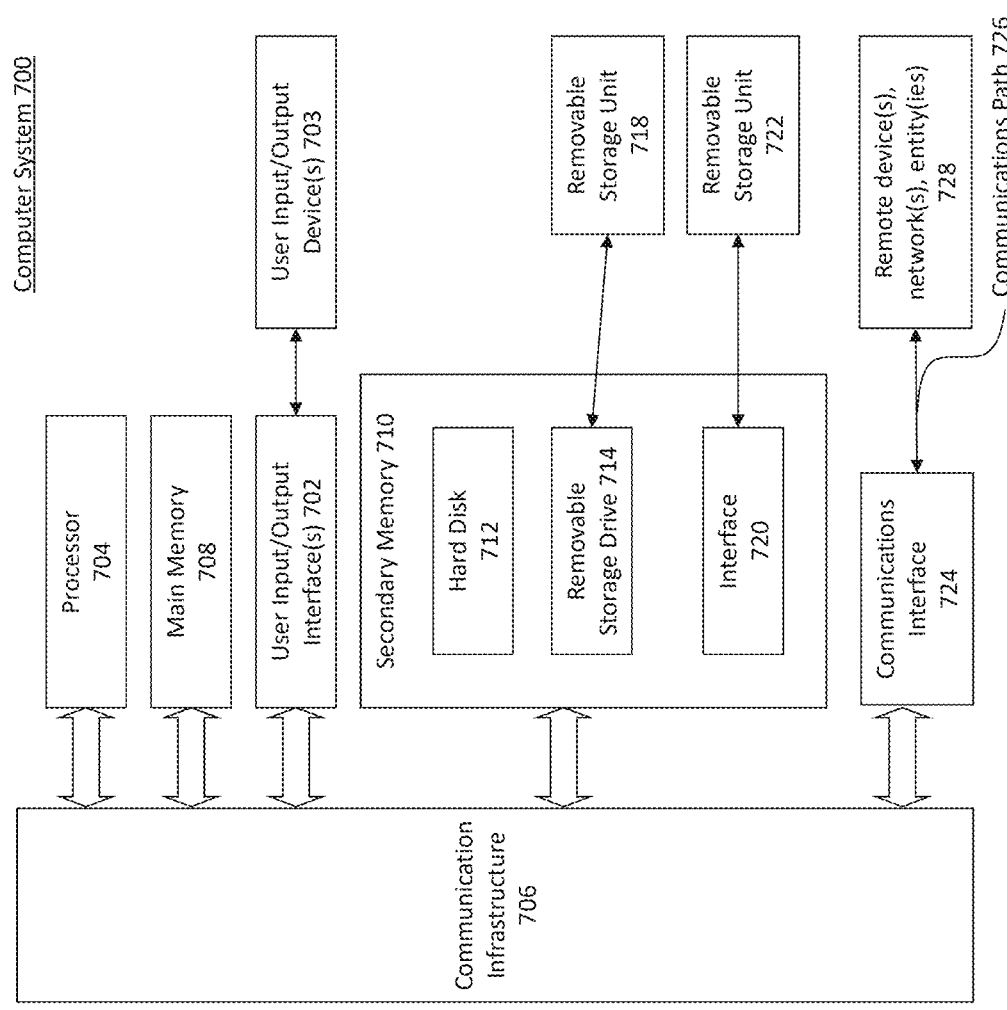
FIG. 7 is an example computer system for implementing some aspects or portion(s) thereof of the disclosure provided herein.

Various aspects can be implemented, for example, using one or more computer systems, such as computer system 700 shown in FIG. 7. Computer system 700 can be any computer capable of performing the functions described herein such as base station 101, UE 103, base station 121, UE 123, base station 125, or base station 127 as shown in FIGS. 1A-1B and FIG. 2, for operations described for processor 209 or process 300. Computer system 700 includes one or more processors (also called central processing units, or CPUs), such as a processor 704. Processor 704 is connected to a communication infrastructure 706 (e.g., a bus). Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 708, the removable storage unit 718, the removable storage unit 722 can store instructions that, when executed by processor 704, cause processor 704 to perform operations for a UE or a base station, e.g., base station 101, UE 103, base station 121, UE 123, base station 125, or base station 127 as shown in FIGS. 1A-1B and FIG. 2. In some examples, the operations include those operations illustrated and described in for processor 209 or process 300 as shown in FIGS. 2-3.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726. Operations of the communication interface 724 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments or examples, at least one of the components set forth in one or more of the preceding figures may be configured to perform one or more operations, techniques, processes, and/or methods as set forth in the example section below. For example, circuitry associated with a thread device, routers, network element, etc. as described above in connection with one or more of the preceding figures may be configured to operate in accordance with one or more of the examples set forth below in the example section.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A method of wireless communications performed by a base station, comprising:
    generating a system scheduling message to be transmitted on a first component carrier (CC) to a user equipment (UE) in a first cell managed by the base station, wherein the system scheduling message comprises a first system message of the first CC including a schedule of monitoring occasions of the first CC in the first cell, and a second system message of the first CC containing a schedule of monitoring occasions for system information of a second CC to be used by the UE in a second cell; and
    transmitting the system scheduling message on the first CC to the UE.

2. The method of claim 1, further comprising:
    transmitting the system information of the second CC to the UE according to the schedule of monitoring occasions for the system information.

3. The method of claim 1, wherein the first cell is an anchor cell (A-cell) operating in a legacy operation mode and the second cell is a booster cell operating in a power saving mode.

4. The method of claim 1, wherein an absolute radio frequency channel number (ARFCN) of the second CC for the second cell is not located in a Global Synchronization Channel Number (GSCN) for a frequency band.

5. The method of claim 1, wherein the system scheduling message comprises a physical layer cell identifier (ID) of the second cell, and an absolute radio frequency channel number (ARFCN) value of the second cell.

6. The method of claim 1, wherein the system scheduling message comprises a downlink control message carried by a physical downlink control channel (PDCCH), and the schedule of monitoring occasions for the system information of the second CC comprises a schedule of PDCCH monitoring occasions for system information block type 1 (SIB1) of the second CC.

7. The method of claim 6, wherein the system scheduling message further comprises a schedule of monitoring occasions for system information of a third CC by the UE in a third cell.

8. The method of claim 1, wherein the system scheduling message comprises a system information block type 1 (SIB1) message of the first CC in the first cell, and the schedule of monitoring occasions for the system information of the second CC is included in a system information block of the first CC that is scheduled by the SIB1 message of the first CC.

9. The method of claim 8, wherein the system scheduling message further configures a first system information (SI) window of a first length for the first CC in the first cell, and a second SI window of a second length different from the first length for the second CC in the second cell.

10. The method of claim 9, wherein the SIB1 message comprises a first SIB message of the first CC in the first cell and a second SIB message of the second CC in the second cell, wherein the second SIB message is placed after the first SIB message within the SIB1 message.

11. The method of claim 1, wherein the first CC is in a first frequency range (FR1), and the second CC is in a second frequency range (FR2).

12. The method of claim 1, wherein the first cell and the second cell are co-located and overlaid, or are non co-located but overlaid.

13. The method of claim 1, wherein a schedule of monitoring occasions of system information for the first CC has a first period, and the schedule of monitoring occasions of the system information for the second CC has a second period different from the first period.

14. A base station, comprising:
    a transceiver configured to enable wireless communication with a user equipment (UE) by a first component carrier (CC) in a first cell managed by the base station; and
    a processor communicatively coupled to the transceiver and configured to:
        generate a system scheduling message to be transmitted on the first CC to the UE in the first cell, wherein the system scheduling message comprises a first system message of the first CC including a schedule of monitoring occasions of the first CC in the first cell, and a second system message of the first CC containing a schedule of monitoring occasions for system information of a second CC to be used by the UE in a second cell; and
        transmit the system scheduling message to the UE on the first CC.

15. The base station of claim 14, wherein the system scheduling message comprises a downlink control message carried by a physical downlink control channel (PDCCH), and the schedule of PDCCH monitoring occasions for the system information of the second CC comprises a schedule of monitoring occasions for system information block type 1 (SIB1) of the second CC.

16. The base station of claim 14, wherein the system scheduling message further comprises a schedule of monitoring occasions for system information of a third CC by the UE in a third cell.

17. The base station of claim 14, wherein the system scheduling message comprises a system information block type 1 (SIB1) message of the first CC in the first cell, and the schedule of monitoring occasions for the system information of the second CC is included in a system information block of the first CC that is scheduled by the SIB1 message of the first CC.

18. The base station of claim 17, wherein the system scheduling message further configures a first system information (SI) window of a first length for the first CC in the first cell, and a second SI window of a second length different from the first length for the second CC in the second cell.

19. A non-transitory computer-readable medium storing instructions that, when executed by a processor of a base station, cause the base station to perform operations, the operations comprising:

generating a system scheduling message to be transmitted on a first component carrier (CC) to a user equipment (UE) in a first cell managed by the base station, wherein the system scheduling message comprises a first system message of the first CC including a schedule of monitoring occasions of the first CC in the first cell, and a second system message of the first CC containing a schedule of monitoring occasions for system information of a second CC to be used by the UE in a second cell; and transmitting the system scheduling message to the UE on the first CC.

20. The non-transitory computer-readable medium of claim 19, wherein the system scheduling message comprises a physical layer cell identifier (ID) of the second cell, and an absolute radio frequency channel number (ARFCN) value of the second cell.

* * * * *